United States Patent
Schepp et al.

(10) Patent No.: US 10,087,961 B2
(45) Date of Patent: Oct. 2, 2018

(54) PISTON AND PISTON-EQUIPPED ASSEMBLY FOR A HYDRAULIC UNIT OR A PISTON-CYLINDER DEVICE OF A VEHICLE BRAKING SYSTEM

(71) Applicant: Robert Bosch GmbH, Stuttgart (DE)

(72) Inventors: Rene Schepp, Waiblingen (DE); Edgar Kurz, Heilbronn-Horkheim (DE); Norbert Alaze, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 369 days.

(21) Appl. No.: 14/947,920

(22) Filed: Nov. 20, 2015

(65) Prior Publication Data

US 2016/0160892 A1 Jun. 9, 2016

(30) Foreign Application Priority Data

Dec. 4, 2014 (DE) .......................... 10 2014 224 889

(51) Int. Cl.
| | |
|---|---|
| *B60T 8/40* | (2006.01) |
| *F15B 15/14* | (2006.01) |
| *F15B 1/24* | (2006.01) |
| *F15B 15/24* | (2006.01) |
| *B60T 7/04* | (2006.01) |
| *B60T 15/36* | (2006.01) |

(52) U.S. Cl.
CPC .......... *F15B 15/1452* (2013.01); *B60T 7/042* (2013.01); *B60T 8/409* (2013.01); *B60T 15/36* (2013.01); *F15B 1/24* (2013.01); *F15B 15/1428* (2013.01); *F15B 15/24* (2013.01)

(58) Field of Classification Search
CPC .. F15B 1/24; F15B 2201/31; F15B 2201/312; B60T 8/4086; B60T 8/409
See application file for complete search history.

(56) References Cited

U.S. PATENT DOCUMENTS

| | | | | |
|---|---|---|---|---|
| 2,347,932 A | * | 5/1944 | Bush | F15B 1/04 138/31 |
| 3,064,687 A | * | 11/1962 | Natho | F15B 1/04 137/508 |
| 5,735,314 A | * | 4/1998 | Alaze | B60T 8/4068 138/31 |

(Continued)

*Primary Examiner* — Michael Leslie

(74) *Attorney, Agent, or Firm* — Norton Rose Fulbright US LLP; Gerard Messina

(57) ABSTRACT

A (collar-equipped) piston and a piston-equipped assembly for a hydraulic unit or a piston-cylinder device of a vehicle braking system, includes a contact surface for a sealing collar, which has a shape curving away from the sealing collar, formed on the piston, so that the sealing collar is pressable, at least partially, into a displacement volume, which is spanned by the contact surface of the piston, with a pressure which is present on a side of the sealing collar directed away from the piston. Also described is a hydraulic unit and a piston-cylinder device for a vehicle braking system, and a vehicle braking system. Further described is a manufacturing method for a piston for a hydraulic unit or a piston-cylinder device of the braking system, and a manufacturing method for a piston-equipped assembly for a hydraulic unit or a piston-cylinder device of the braking system.

8 Claims, 3 Drawing Sheets

(56) References Cited

U.S. PATENT DOCUMENTS

| | | | | |
|---|---|---|---|---|
| 6,390,133 B1 * | 5/2002 | Patterson | ............ | B60T 8/3615 |
| | | | | 138/30 |
| 7,997,665 B2 * | 8/2011 | Nakazawa | ............ | B60T 8/368 |
| | | | | 188/112 R |
| 8,010,269 B2 * | 8/2011 | Toyohira | .................. | B60T 7/06 |
| | | | | 60/562 |
| 8,850,810 B2 * | 10/2014 | Murayama | ............ | B60T 7/042 |
| | | | | 60/553 |

* cited by examiner

US 10,087,961 B2

PISTON AND PISTON-EQUIPPED ASSEMBLY FOR A HYDRAULIC UNIT OR A PISTON-CYLINDER DEVICE OF A VEHICLE BRAKING SYSTEM

RELATED APPLICATION INFORMATION

The present application claims priority to and the benefit of German patent application no. 10 2014 224 889.2, which was filed in Germany on Dec. 4, 2014, the disclosure of which is incorporated herein by reference.

FIELD OF THE INVENTION

The present invention relates to a piston and a piston-equipped assembly for a hydraulic unit or a piston-cylinder device of a vehicle braking system. Moreover, the present invention relates to a hydraulic unit for a vehicle braking system, a piston-cylinder device for a vehicle braking system, and a vehicle braking system. Furthermore, the present invention relates to a manufacturing method for a piston for a hydraulic unit or a piston-cylinder device of a vehicle braking system, and a manufacturing method for a piston-equipped assembly for a hydraulic unit or a piston-cylinder device of a vehicle braking system.

BACKGROUND INFORMATION

FIG. 1 shows a cross section of a pedal stroke simulator according to the related art.

The conventional pedal stroke simulator schematically depicted in FIG. 1 is installed in the Toyota Prius III. As a housing, the conventional pedal stroke simulator includes a cast part 10 and a cover 12 inserted into cast part 10. A first hydraulic chamber 14 and a second hydraulic chamber 16 are formed in the housing. A displaceable piston 18 which bears an O-ring 20 and which is supported with the aid of two simulator springs 22 and 24 situated in second hydraulic chamber 16 is inserted between first hydraulic chamber 14 and second hydraulic chamber 16. A first simulator spring 22 of the two simulator springs 22 and 24 has a much lower spring stiffness than a second simulator spring 24 of the two simulator springs 22 and 24. Second simulator spring 24, which contacts cover 12, presses a spring plate 26 away from cover 12. Piston 18 is pressed away from the inner base surface of spring plate 26 with the aid of first simulator spring 22, which contacts an inner base surface of spring plate 26.

Brake fluid which is pressed from a master brake cylinder, connected to the conventional pedal stroke simulator, with the aid of a driver brake force is displaceable into first hydraulic chamber 14 via a connecting borehole 28 formed in cast part 10. In addition, a volume compensation opening 30 via which brake fluid is transferable from second hydraulic chamber 16 into a connected brake fluid reservoir is formed on cast part 10. Braking by a driver (via the master brake cylinder) into the conventional pedal stroke simulator initially causes a displacement motion of piston 18 from first hydraulic chamber 14 into second hydraulic chamber 16, with deformation of first simulator spring 22, until piston 18 strikes the inner base surface of spring plate 26. If the driver brakes further into the conventional pedal stroke simulator after piston 18 strikes the inner base surface of spring plate 26, piston 18 and spring plate 26 are pressed in the direction of cover 12, with deformation of second simulator spring 24. With the aid of the driver brake force, the driver may press piston 18 far enough into second hydraulic chamber 16 that an elastomer component 32 mounted on cover 12 is deformed. The aim is thus for a pressure-volume characteristic curve having a large pressure rise at the end of the volume intake to be achievable for the conventional pedal stroke simulator.

SUMMARY OF THE INVENTION

The present invention provides a piston for a hydraulic unit or a piston-cylinder device of a vehicle braking system having the features of claim 1, a piston-equipped assembly for a hydraulic unit or a piston-cylinder device of a vehicle braking system having the features of claim 4, a piston-cylinder device for a vehicle braking system having the features of claim 10, a hydraulic unit for a vehicle braking system having the features of claim 12, a vehicle braking system having the features of claim 13, a manufacturing method for a piston for a hydraulic unit or a piston-cylinder device of a vehicle braking system having the features of claim 14, and a manufacturing method for a piston-equipped assembly for a hydraulic unit or a piston-cylinder device of a vehicle braking system having the features of claim 15.

Advantages of the Invention

The present invention implements multifunctionality of the sealing collar: the sealing collar may continue to be used for sealing off a pressure chamber volume delimited by both the piston and the sealing collar. However, the sealing collar may also be used as a "spring element" which opposes an enlargement of the pressure chamber volume with a counterforce. Due to the multifunctionality of the sealing collar, for example an additional spring having a spring constant corresponding to the counterforce of the sealing collar may be dispensed with. This reduces the manufacturing costs for a device which is equipped at least with the piston and the sealing collar. In addition, the multifunctionality of the sealing collar facilitates minimization of such a device.

In one advantageous specific embodiment of the piston/the piston-equipped assembly, the piston includes a base area and a cylindrical area, the contact surface being formed on the base area. The contact surface may thus be formed comparatively easily, for example by appropriately bending a base area which is punched out of sheet metal.

In addition, the piston together with the sealing collar fastened thereto may be displaceably situated within an internal volume of the hydraulic unit or the piston-cylinder device in such a way that a partial volume of the internal volume is delimitable as a pressure chamber with the aid of the sealing collar and the piston, the sealing collar and the piston being displaceable against at least one elastic force of at least one spring in such a way that a filling volume of the pressure chamber which is fillable with brake fluid is increasable. Similarly also for the piston-equipped assembly, the cover element may be mountable on the hydraulic unit or on the at least one housing part of the piston-cylinder device in such a way that a partial volume of the internal volume sealed off on the outer side by the cover element is delimitable as a pressure chamber with the aid of the sealing collar and the piston, the sealing collar and the piston being displaceable against at least one elastic force of the at least one spring in such a way that a filling volume of the pressure chamber which is fillable with brake fluid is increasable.

The at least one spring may be pretensioned with the aid of the stop element, which is pressed onto the pin. In this case the piston-equipped assembly not only is usable as a compact insertion part, but also is testable, and/or configurable with regard to a desired compression characteristic curve, before it is situated in the piston-cylinder device/the hydraulic unit.

In addition, a spring plate lined up on the pin may be supported by the piston with the aid of a first spring as the at least one spring, the spring plate being supported by the cover element with the aid of a second spring as the at least one spring. As discussed in greater detail below, in this case a jump-in working range is also providable on the piston-cylinder device/the hydraulic unit.

In one advantageous refinement, a first elastically compressible element is fastened to the inner side of the cover element, and/or a second elastically compressible element is fastened to an outer base surface of the spring plate which is oriented toward the piston. With the aid of the first elastically compressible element, a transition from the jump-in working range into a subsequent working range may be softened. The second elastically compressible element ensures a large force increase/pressure rise at one end of a volume intake.

The advantages described above are also achieved with a piston-cylinder device for a vehicle braking system which includes a corresponding piston or which includes a piston-equipped assembly of this type.

The piston-cylinder device may be configured as a simulator. However, the configuration of the piston-cylinder device is not limited to simulators.

A hydraulic unit for a vehicle braking system which includes a corresponding piston or which includes a piston-equipped assembly of this type also has the advantages described above.

A vehicle braking system which includes a corresponding piston, a piston-equipped assembly of this type, a corresponding piston-cylinder device, or a hydraulic unit likewise has the advantages described above.

In addition, carrying out a corresponding manufacturing method for a piston for a hydraulic unit or a piston-cylinder device of a vehicle braking system has the described advantages. A refinement of the manufacturing method according to the specific embodiments of the piston described above is possible.

Moreover, carrying out a corresponding manufacturing method for a piston-equipped assembly for a hydraulic unit or a piston-cylinder device of a vehicle braking system also provides the desired advantages. The manufacturing method according to the specific embodiments of the piston-equipped assembly described above may be refined. For example, the at least one spring may be pretensioned with the aid of a stop element pressed onto the pin.

Further features and advantages of the present invention are explained below with reference to the figures.

DETAILED DESCRIPTION

Figure 1:
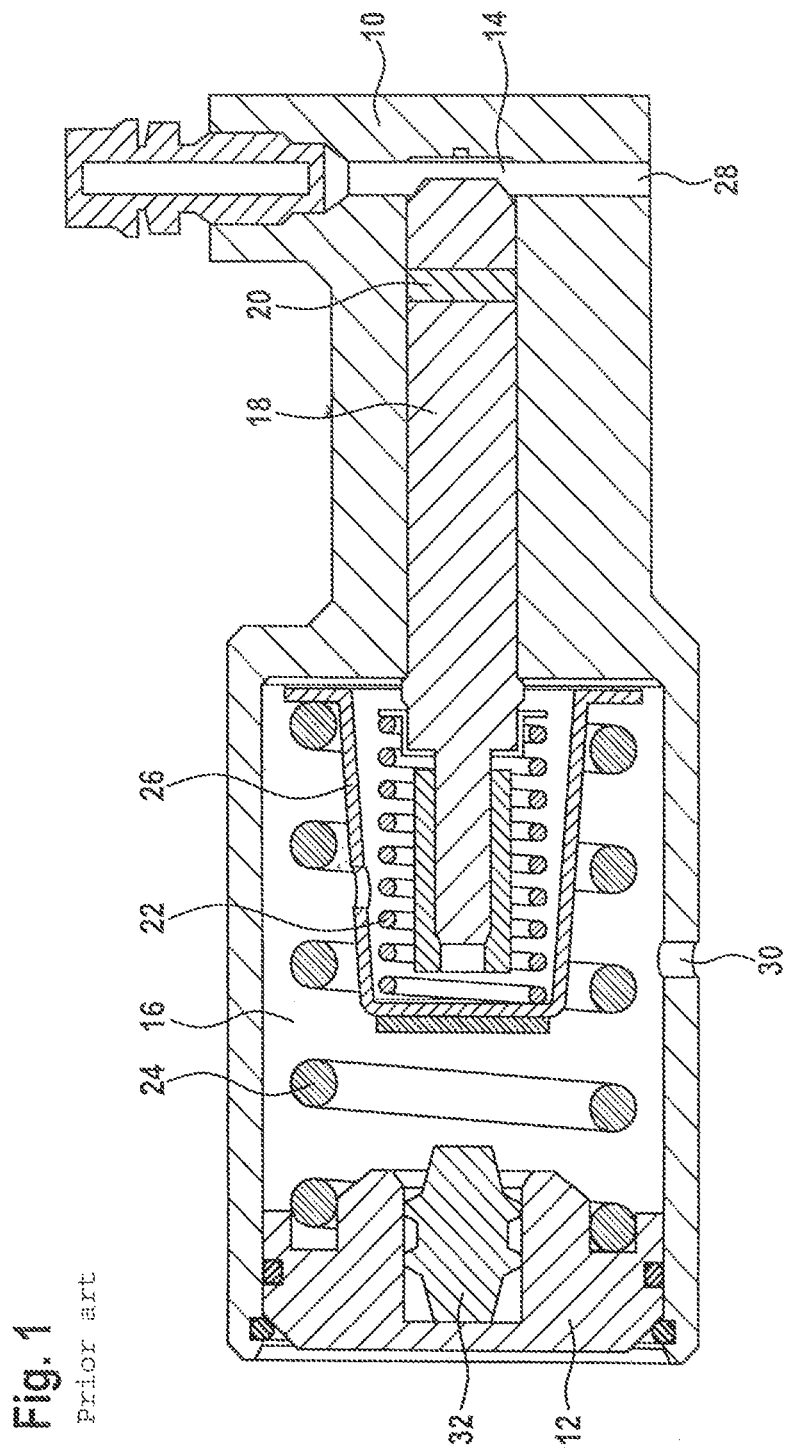
FIG. 1 shows a cross section of a pedal stroke simulator according to the related art.
Figure 2:
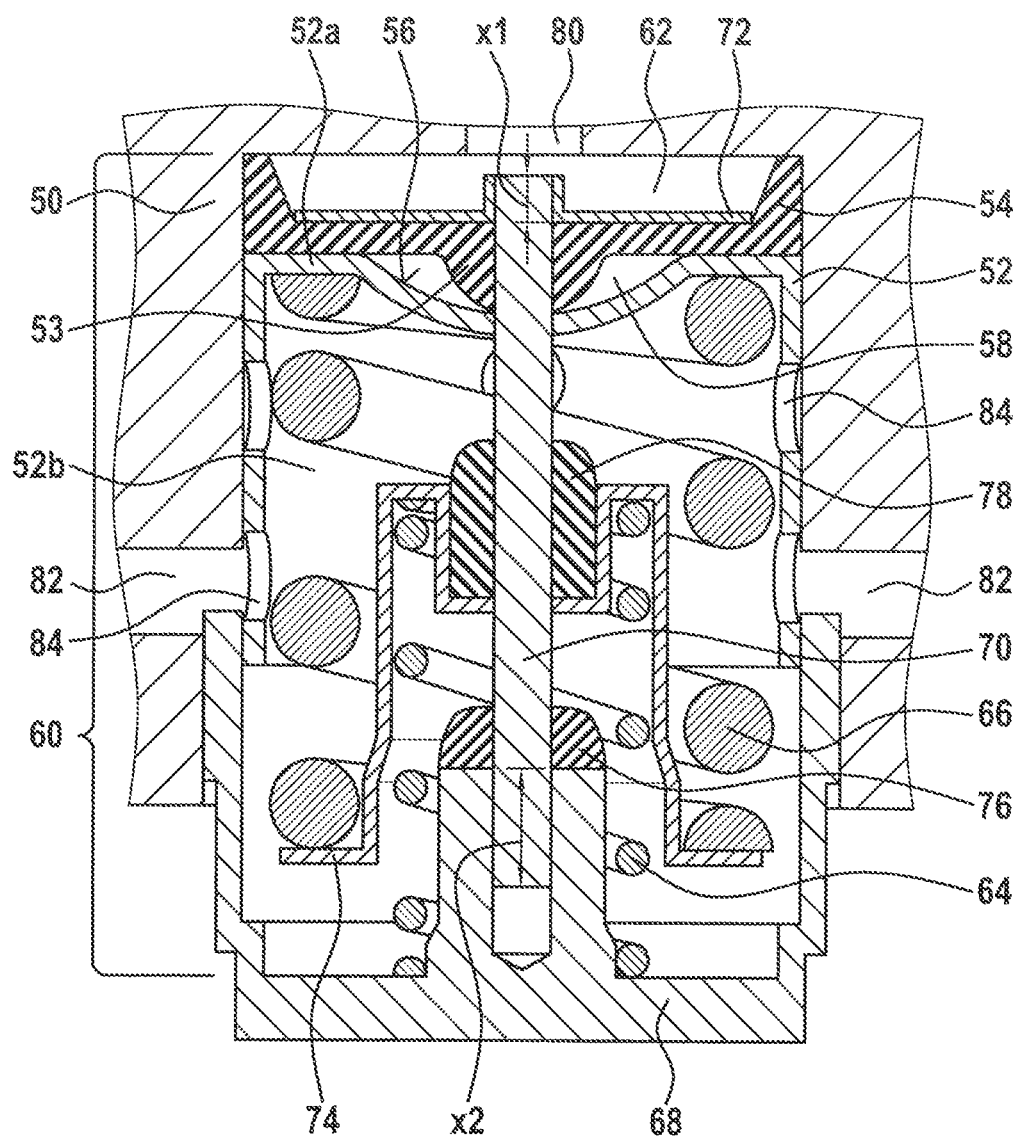
FIG. 2 shows a schematic illustration of one specific embodiment of the piston-cylinder device.

FIG. 2 shows a schematic illustration of one specific embodiment of the piston-cylinder device.

The piston-cylinder device schematically illustrated in FIG. 2 is usable in a vehicle braking system. In particular, the piston-cylinder device is usable as a simulator/simulator device, for example as a pedal simulator, pedal travel simulator, or pedal stroke simulator, in the vehicle braking system. However, it is pointed out that the piston-cylinder device may also be used for carrying out some other function in the braking system. In addition, usability of the piston-cylinder device is not limited to a specific type of braking system.

The piston-cylinder device in FIG. 2 is configured with its own housing (made up of at least one housing part 50). However, it is pointed out that, except for the at least one housing part 50, all other features of the piston-cylinder device are also correspondingly providable in a hydraulic unit for a vehicle braking system. Likewise, at least the part equipped with the features may be used as a simulator/simulator device, for example as a pedal simulator, pedal travel simulator, or pedal stroke simulator, in numerous different vehicle braking systems. Furthermore, usability of the hydraulic unit configured corresponding to the piston-cylinder device is not limited to either carrying out a simulator function or to a specific type of braking system.

The piston-cylinder device includes at least one piston 52 and a sealing collar 54 which cooperates with same. As discussed in greater detail below, sealing collar 54 may be fastened to (collar-equipped) piston 52, for example. Likewise, piston 52 and sealing collar 54 may be parts of a piston-equipped assembly. Piston 52 and sealing collar 54 are situated next to one another in the piston-cylinder device. There may always be physical contact between piston 52 and sealing collar 54.

In addition, a contact surface 56 for sealing collar 54 which has a shape that curves away from sealing collar 54 is formed on piston 52. For example, an indentation or a concave recess may be formed on contact surface 56 of piston 52 oriented toward sealing collar 54. However, the shape of contact surface 56 curving away from sealing collar 54 may also be understood to mean an uneven design of contact surface 56, for example a design of at least one edge and/or at least one step on contact surface 56. If sealing collar 54 is present in its original shape without a force effect/pressure effect on it, sealing collar 54, present in its original shape, and contact surface 56 may enclose a displacement volume 58. Displacement volume 58 may also be described as a displacement volume 58 which is spanned by contact surface 56 of piston 52.

With the aid of the configuration of contact surface 56 described above, it may be ensured that sealing collar 54 is pressable, at least partially, into displacement volume 58 with the aid of a pressure which is present on a side of sealing collar 54 directed away from piston 52. In particular, axially extending grooves may by formed on a side of sealing collar 54 directed toward piston 52, via which liquid/brake fluid may flow out of displacement volume 58 with virtually no force. Optionally, a protruding buffer area 53 may also be formed on a side of piston 52 directed toward sealing collar 54.

Sealing collar 54 is thus not only suitable for sealing off a pressure chamber volume delimited both by piston 52 and sealing collar 54, but may also be used as a "spring element" which opposes an enlargement of the pressure chamber volume, which is delimited both by piston 52 and sealing collar 54, with a (definable) counterforce. In particular, the counterforce of sealing collar 54, used as a "spring element," already acts against brake fluid pressing into the pressure chamber volume prior to a displacement motion of piston 52 from its starting position. (A starting position may be referred to as a position of piston 52 in which piston 52 is present without a force effect/pressure effect on it.) As discussed in greater detail below, this multifunctionality of sealing collar 54 contributes to the improvement of a characteristic curve of the piston-cylinder device (or of a part of the hydraulic unit equipped with piston 52 and sealing collar 54).

In the specific embodiment in FIG. 2, piston 52 includes a base area 52a and a cylindrical area 52b, contact surface 56 being formed on base area 52a of piston 52. Alternatively, however, a piston 52 having a compact design (as a cylinder) may be provided with contact surface 56.

In one alternative specific embodiment, sealing collar 54 may be fastened to at least one fastening point of piston 52. In this case, piston 52 together with sealing collar 54 (as a component) fastened thereto is displaceably situated within an internal volume 60 of the piston-cylinder device. In this case as well, a partial volume 62 of internal volume 60 is delimitable as a pressure chamber 62 with the aid of sealing collar 54 and piston 52. For example, sealing collar 54 and base area 52a of piston 52 delimit pressure chamber 62, while cylindrical area 52b of piston 52 is directed away from pressure chamber 62. Seepage of brake fluid from pressure chamber 62 along an outer surface of piston 52 is also preventable with the aid of sealing collar 54. With the aid of at least one spring 64 and 66, piston 52 and sealing collar 54 may be supported in the piston-cylinder device in such a way that sealing collar 54 and piston 52 are displaceable against at least one elastic force of the at least one spring 64 and 66 in such a way that a filling volume of pressure chamber 62 which is fillable with brake fluid is increasable.

However, in the specific embodiment in FIG. 2, piston 52 and sealing collar 54 are elements of a piston-equipped assembly. The piston-equipped assembly includes a cover element 68, a pin 70 situated on an inner side of cover element 68, on which at least sealing collar 54 and a piston 52 are lined up, and a stop element 72 which is mounted on pin 70 in such a way that piston 52 or sealing collar 54 is prevented from sliding off pin 70 with the aid of stop element 72. Stop element 72 may be a stop washer 72, for example. In addition, the piston-equipped assembly includes the at least one spring 64 and 66, with the aid of which piston 52 is supported by cover element 68. Use of this type of piston-equipped assembly simplifies manufacturability of the piston-cylinder device, and thus reduces the requirements for a manufacturing system which is suitable for manufacturing the piston-cylinder device.

A filling volume of pressure chamber 62 which is fillable with brake fluid is generally minimal when piston 52 is in its starting position. Piston 52 is displaceable against the at least one elastic force of the at least one spring 64 and 66 in such a way that the filling volume of pressure chamber 62 which is fillable with brake fluid is increasable. This is often also referred to as a volume intake in pressure chamber 62.

Cover element 68 may be utilized as a closing lid and/or as part of the housing of the piston-cylinder device. For this purpose, cover element 68 is configured in such a way that it is mountable on housing part 50 of the piston-cylinder device (or on the corresponding hydraulic unit). Internal volume 60 which is present in the piston-cylinder device (or the corresponding hydraulic unit) may thus be sealed off in a fluid-tight manner on an outer side of housing part 50 (or of the hydraulic unit) with the aid of cover element 68. Cover element 68 may be fastened in a fluid-tight manner to housing part 50 (or to the hydraulic unit) by pressing or caulking, for example. If desired, cover element 68 together with housing part 50 may form the housing of the piston-cylinder device. (This type of cover element 68 may also be advantageously used when the piston-cylinder device is equipped with (collar-equipped) piston 52.)

In particular, cover element 68 may be mountable on housing part 50 of the piston-cylinder device (or the corresponding hydraulic unit) in such a way that partial volume 62 of internal volume 60, which is sealed off by cover element 68 on the outer side, is delimitable as a pressure chamber 62 with the aid of sealing collar 54 and piston 52. In this case, sealing collar 54 and piston 52 are displaceable against the at least one elastic force of the at least one spring 64 and 66 in such a way that the filling volume of pressure chamber 62 which is fillable with brake fluid is increasable.

The piston-equipped assembly in FIG. 2 has, as an example, a first spring 64 and a second spring 66 as the at least one spring 64 and 66. In addition, the piston-equipped assembly has a spring plate 74 which is lined up on pin 70. (Optionally, the at least two springs 64 and 66 and spring plate 74 may also be added when the piston-cylinder device is equipped with (collar-equipped) piston 52.)

Spring plate 74 is supported by cover element 68 with the aid of first spring 64. For this purpose, first spring 64 is supported on cover element 68 on a first side, and is supported on an inner base surface of spring plate 74 on a second side directed away from cover element 68. Piston 52 is supported by spring plate 74 with the aid of second spring 66. While a first side of second spring 66 rests against base area 52a of piston 52, a second side of second spring 66 which is directed away from base area 52a is supported on a surface of a flange of spring plate 74 directed away from cover element 68. Second spring 66 extends partially through an internal volume of piston 52 spanned by base area 52a and cylindrical area 52b. Situating second spring 66, at least partially, in the piston internal volume allows a reduction in the space requirements of the piston-equipped assembly. The piston-equipped assembly is also easily installable in this case.

First spring 64 has a lower spring stiffness than second spring 66. An initial displacement of piston 52 from its starting position therefore initially results in an (exclusive) deformation of first spring 64, as the result of which a jump-in working range of the piston-cylinder device is simulatable. First spring 64 may therefore also be referred to as a jump-in spring. After spring plate 74 strikes cover element 68, a further displacement of piston 52, with an (exclusive) deformation of second spring 66, takes place. After spring plate 74 strikes cover element 68, a further displacement of brake fluid into pressure chamber 62 therefore requires an increased force in relation to the jump-in working range. However, it is pointed out that a design of the piston-equipped assembly is not limited to its being equipped with exactly two springs 64 and 66.

In addition, the at least one spring 64 and 66 of the piston-equipped assembly, in particular first spring 64 with the lower spring stiffness, may be pretensioned with the aid of stop element 72 which is pressed onto pin 70. In particular, a distance x1 between one end of pin 70 directed away from cover element 68 and stop element 72 is variable for setting a desired pretension of the at least one spring 64 and 66 of the piston-equipped assembly. Alternatively or additionally, a penetration depth x2 of pin 70 into cover element 68 may be varied for setting the desired pretension of the at least one spring 64 and 66 of the piston-equipped assembly. The piston-equipped assembly illustrated in FIG. 2 may thus be easily tested, and/or configured with regard to a characteristic curve, before it is situated in the piston-cylinder device. In particular, tolerances may be compensated for by varying distance x1 and/or penetration depth x2.

As an advantageous refinement of the piston-equipped assembly, a first elastically compressible element 76 may be fastened to the inner side of cover element 68, in particular on a projection formed on the inner side of cover element 68. In addition, spring plate 74 may have a central concave recess on its plate base which protrudes into a volume spanned by spring plate 74. In this case, a protruding partial surface of the inner base surface of spring plate 74 contacts first elastically compressible element 76 when first spring 64 is compressed. The initial displacement of piston 52 from its starting position until it strikes spring plate 74 on cover element 68 (with the deformation of first spring 64), after spring plate 74 strikes first elastically compressible element 76, acts against an additional "elastic force" of first elastically compressible element 76 (in addition to a first elastic force of first spring 64). This additional "elastic force" of first elastically compressible element 76 causes "blending" between the jump-in working range of the piston-cylinder device (characterized by the first elastic force of first spring 64) and a further working range of the piston-cylinder device subsequent to the jump-in working range (characterized by a second elastic force of second spring 66). In other words, a force-volume characteristic curve (or pressure-volume characteristic curve) of the piston-cylinder device includes an intermediate section, situated between a jump-in partial section with a low slope and a further partial section with a higher slope, which at least has a slope situated between a maximum slope of the jump-in partial section and a minimum slope of the further partial section, which results from the first elastic force of first spring 64 and also from the additional "elastic force" of first elastically compressible element 76.

As an alternative or in addition to first elastically compressible element 76, a second elastically compressible element 78 may be fastened to an outer base surface of spring plate 74, in particular in the central concave recess, oriented toward piston 52/its base area 52a. It may thus be ensured (after spring plate 74 strikes cover element 68) that piston 52/its base area 52a contacts second elastically compressible element 78 when second spring 66 is compressed. After piston 52 strikes second elastically compressible element 78, an additional "elastic force" of second elastically compressible element 78 acts against the further displacement of piston 52 (in addition to the second elastic force of second spring 66). Second elastically compressible element 78 therefore results in a force-volume characteristic curve (or pressure-volume characteristic curve) of the piston-cylinder device, which for a large volume in pressure chamber 62 of piston-cylinder device also has large force values (or pressure values). In other words, the force-volume characteristic curve (or pressure-volume characteristic curve) of the piston-cylinder device has a relatively large force increase (or pressure rise) at one end of its volume intake in pressure chamber 62.

Optionally, first elastically compressible element 76 and second elastically compressible element 78 may also be added when piston-cylinder device is equipped with (collar-equipped) piston 52.

During operation of the piston-cylinder device, a master brake cylinder may be connected to the piston-cylinder device (for example, via at least one line, not depicted) in such a way that brake fluid is displaceable from the master brake cylinder into pressure chamber 62 via at least one connecting borehole 80. Likewise, an brake fluid reservoir (with an atmospheric pressure present therein) is connectable/connected to the piston-cylinder device via at least one line, not illustrated, in such a way that brake fluid is transferable into the brake fluid reservoir from a residual volume of internal volume 60, delimited from pressure chamber 62 with the aid of piston 52 and sleeve 54, via at least one volume exchange borehole 82. (An undesirable complete covering of the at least one volume exchange borehole 82 is preventable, also during displacement of piston 52, by forming multiple through holes/punched holes 84 at a different level of cylindrical area 52b.) With the aid of the driver brake force exerted on a brake actuating element connected to the master brake cylinder, a driver of the vehicle equipped with the piston-cylinder device may thus brake into the piston-cylinder device via the master brake cylinder and the at least one connecting borehole 80, and effectuate a volume intake into pressure chamber 62/enlargement of pressure chamber 62.

The mode of operation of the piston-cylinder device (as a simulator) is discussed once again below:

Prior to actuation of the brake actuating element, piston 52 is in its starting position, sealing collar 54 having its original shape. At the start of braking into the piston-cylinder device by the driver, the slight pressure buildup in pressure chamber 62 causes sealing collar 54 to be at least partially pressed into displacement volume 58. The driver thus perceives the slight counterforce of sealing collar 54 which acts as a "spring element," which, however, is still below the first elastic force of first spring 64. The piston-cylinder device therefore has a force-volume characteristic curve (or a pressure-volume characteristic curve) with a relatively small force increase (pressure rise) at the start of a volume intake in pressure chamber 62/the piston-cylinder device. In addition, since displacement volume 58 may be moved virtually without force, a force jump (pressure jump) in the force-volume characteristic curve (or the pressure-volume characteristic curve) is avoided.

Further braking into the piston-cylinder device by the driver causes a displacement of piston 52, initially with a compression solely of first spring 64. During this operation, second spring 66 may remain in its (pretensioned) original shape. The braking driver must therefore apply comparatively little driver brake force for initially displacing piston 52 from its starting position. The force-volume characteristic curve (or pressure-volume characteristic curve) thus has a jump-in working range.

Toward the end of the jump-in working range, spring plate 74 contacts first elastically compressible element 76. The first elastic force of first spring 64 as well as the "elastic force" of first elastically compressible element 76 accordingly act against further displacement of piston 52. This causes blending between the jump-in working range and the subsequent further working range. Thus, the driver does not perceive an abrupt change between the jump-in working range and the further working range.

The further displacement of piston 52, with a deformation of second spring 66, takes place only after spring plate 74 strikes cover element 68. Due to the second elastic force of second spring 66 which acts against the further inward displacement of piston 52, the driver must apply a much higher driver brake force for the braking after the jump-in working range is overcome. In this braking situation, the driver thus has a standard brake actuating feel (pedal feel).

As soon as base area 52a/piston 52 contacts second elastically compressible element 78, further enlargement of pressure chamber 62 also requires, in addition to the deformation of second spring 66, an (elastic) deformation of second elastically compressible element 78. For enlarging the volume of pressure chamber 72 which is fillable with brake fluid, with the aid of a driver brake force the driver must therefore overcome not only the second elastic force of second spring 66, but also the "elastic force" acting against the elastic deformation of second elastically compressible element 78. A progressive force-volume characteristic curve (or a progressive pressure-volume characteristic curve) upon further enlargement of pressure chamber 72 is thus ensured. In particular, the piston-cylinder device has a (multi-stage progressive) force-volume characteristic curve (or pressure-volume characteristic curve), which for a large volume intake into pressure chamber 62 has a large force increase (or a large pressure rise).

Pin 70 and stop element 72 remain stationary during the displacement of piston 52. Pin 70 and stop element 72 thus implement an additional sealing point for sealing collar 54.

The advantages described above are also provided in a vehicle braking system of the piston-cylinder device (or the corresponding hydraulic unit).

Figure 3:
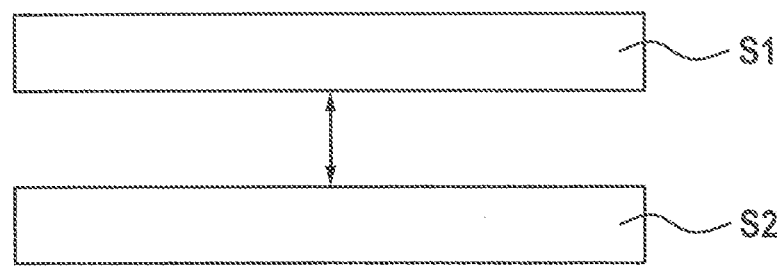
FIG. 3 shows a flow chart for explaining one specific embodiment of the manufacturing method for a piston for a hydraulic unit or a piston-cylinder device of a vehicle braking system.

FIG. 3 shows a flow chart for explaining one specific embodiment of the manufacturing method for a piston for a hydraulic unit or a piston-cylinder device of a vehicle braking system.

A sealing collar is fastened to at least one fastening point of the piston in a method step S1. The piston may thus be described as a collar-equipped piston.

In a method step S2 which is carried out previously, concurrently, or subsequently, a contact surface for the sealing collar, having a shape that curves away from the sealing collar which is fastened to the piston beforehand or subsequently, is formed on the piston. It may thus be ensured that during subsequent operation of the hydraulic unit or the piston-cylinder device, the sealing collar is pressed, at least partially, into a displacement volume spanned by the contact surface of the piston with the aid of a pressure (present on a side of the sealing collar directed away from the piston).

Figure 4:
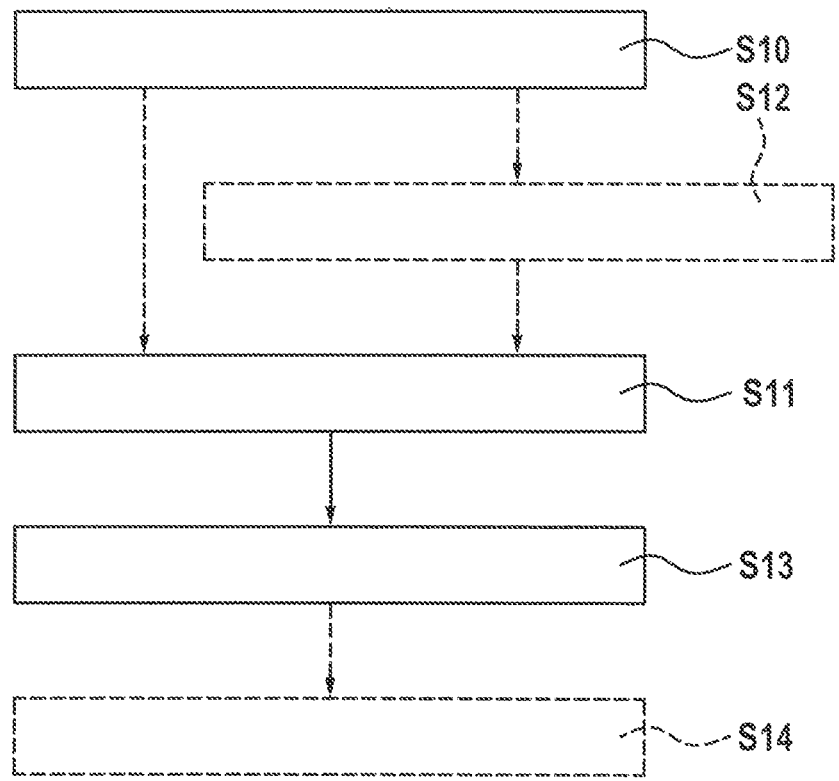
FIG. 4 shows a flow chart for explaining one specific embodiment of the manufacturing method for a piston-equipped assembly for a hydraulic unit or a piston-cylinder device of a vehicle braking system.

FIG. 4 shows a flow chart for explaining one specific embodiment of the manufacturing method for a piston-equipped assembly for a hydraulic unit or a piston-cylinder device of a vehicle braking system.

A pin is situated on an inner side of a cover element in a method step S10. The pin may, for example, be pressed into the cover element. The cover element is suitable for mounting on the hydraulic unit or on at least one housing part of the piston-cylinder device, and for sealing off an internal volume, situated in the hydraulic unit or the piston-cylinder device, on an outer side of the hydraulic unit or the piston-cylinder device (with the aid of the cover element). In particular, the cover element may be appropriately formed/shaped in an (optional) method step carried out prior to method step S10.

At least one sealing collar and a piston having a contact surface for the sealing collar, with a shape curving away from the sealing collar, are lined up on the pin in a method step S11, the piston being supported by the cover element with the aid of at least one spring. It may thus be ensured that during subsequent operation of the hydraulic unit or the piston-cylinder device, the sealing collar is at least partially pressed into a displacement volume spanned by the contact surface of the piston with the aid of a pressure (present on a side of the sealing collar directed away from the piston). Optionally, prior to method step S11, a method step S12 may be carried out in which the piston is shaped with the desired contact surface for the sealing collar.

A method step S13 is subsequently carried out in which a stop element is mounted on the pin in such a way that the piston or the sealing collar is prevented from sliding off the pin. For example, the piston or the sealing collar may be prevented from sliding off the pin by pressing a retaining washer (as a stop element) onto the pin.

Optionally, the method may also include a method step S14 in which the at least one spring is pretensioned with the aid of the stop element which is pressed onto the pin. Alternatively or additionally, a penetration depth of the pin into the cover element may be varied for setting a desired pretension of the at least one spring.

What is claimed is:

1. A piston-equipped assembly for a hydraulic unit or a piston-cylinder device of a vehicle braking system, comprising:
   a cover element which is mountable on the hydraulic unit or on at least one housing part of the piston-cylinder device so that an internal volume situated in the hydraulic unit or the piston-cylinder device is sealable off on an outer side of the hydraulic unit or the piston-cylinder device with the cover element;
   a pin, situated on an inner side of the cover element, on which at least one sealing collar and a piston are lined up, a contact surface for the sealing collar, having a shape that curves away from the sealing collar, and being formed on the piston, so that the sealing collar is at least partially pressable into a displacement volume spanned by the contact surface of the piston with a pressure which is present on a side of the sealing collar directed away from the piston;
   a stop element, which is mounted on the pin so that the piston or the sealing collar is prevented from sliding off the pin; and
   at least one spring by which the piston is supported by the cover element.

2. The piston-equipped assembly of claim 1, wherein the piston includes a base area and a cylindrical area, and the contact surface is formed on the base area.

3. The piston-equipped assembly of claim 1, wherein the cover element is mountable on the hydraulic unit or on the at least one housing part of the piston-cylinder device so that a partial volume of the internal volume sealed off on the outer side by the cover element is delimitable as a pressure chamber with the sealing collar and the piston, the sealing collar and the piston being displaceable against at least one elastic force of the at least one spring so that a filling volume of the pressure chamber which is Tillable with brake fluid is increasable.

4. The piston-equipped assembly of claim 1, wherein the at least one spring is pretensioned with the stop element which is pressed onto the pin.

5. The piston-equipped assembly of claim 1, wherein a spring plate lined up on the pin is supported by the piston with a first spring as the at least one spring, and the spring plate is supported by the cover element with a second spring as the at least one spring.

6. The piston-equipped assembly of claim 5, wherein a first elastically compressible element is fastened to the inner side of the cover element, and/or a second elastically compressible element is fastened to an outer base surface of the spring plate which is oriented toward the piston.

7. A manufacturing method for a piston-equipped assembly for a hydraulic unit or a piston-cylinder device of a vehicle braking system, the method comprising:
- situating a pin on an inner side of a cover element for mounting on the hydraulic unit or on at least one housing part of the piston-cylinder device, and for sealing off an internal volume, situated in the hydraulic unit or the piston-cylinder device, on an outer side of the hydraulic unit or the piston-cylinder device;
- lining up on the pin at least one sealing collar and a piston, having a contact surface for the sealing collar, with a shape curving away from the sealing collar, the piston being supported by the cover element with the aid of at least one spring, so that during subsequent operation of the hydraulic unit or the piston-cylinder device, the sealing collar is pressed, at least partially, into a displacement volume spanned by the contact surface of the piston with a pressure which is present on a side of the sealing collar directed away from the piston; and
- mounting a stop element on the pin so that the piston or the sealing collar is prevented from sliding off the pin.

8. The manufacturing method of claim 7, wherein the at least one spring is pretensioned with the stop element, which is pressed onto the pin.

* * * * *